United States Patent [19]

Efantis

[11] Patent Number: 5,210,971
[45] Date of Patent: May 18, 1993

[54] FISHING ROD HOLDER

[76] Inventor: John Efantis, 3257 E. 136th St., Chicago, Ill. 60603

[21] Appl. No.: 824,545

[22] Filed: Jan. 23, 1992

[51] Int. Cl.⁵ ............................. A01K 97/10
[52] U.S. Cl. ............................. 43/21.2; 248/514
[58] Field of Search ............. 43/21.2, 16, 17, 27.4; 248/514, 515

[56] References Cited

U.S. PATENT DOCUMENTS

| D. 219,971 | 2/1971 | Bennett | 43/21.2 |
|---|---|---|---|
| 1,373,414 | 4/1921 | Elphinstone | 248/515 |
| 2,693,660 | 11/1954 | Nebergall et al. | 43/21.2 |
| 2,918,237 | 12/1959 | Boesch | 248/42 |
| 2,958,491 | 11/1960 | Ackley | 248/514 |
| 3,000,599 | 9/1961 | Honig | 248/38 |
| 3,802,112 | 4/1974 | Banner | 43/21.2 |
| 3,964,706 | 6/1976 | Adams | 43/21.2 |
| 4,093,171 | 6/1978 | Mengo, Sr. | 248/515 |
| 4,097,017 | 6/1978 | Hazlitt | 248/515 |
| 4,407,089 | 10/1983 | Miller | 43/21.2 |
| 4,495,721 | 1/1985 | Emory, Jr. | 43/21.2 |
| 4,528,768 | 7/1985 | Anderson | 43/21.2 |
| 4,641,395 | 2/1987 | Banks | 16/348 |
| 4,807,384 | 2/1989 | Roberts, Sr. | 43/21.2 |

FOREIGN PATENT DOCUMENTS 447882  4/1948  Canada .................. 43/21.2

OTHER PUBLICATIONS

K-Line Industries, "Invader '88", Aug. 1987.
Big Jon, Inc. "Big Jon 1991 Downriggers", 1991.
S & K Products, Inc. "Add Depth to Your Sport Fishing—Cannon 1989", 1989.
S & K Products, Inc. "Digi-Troll III: The Fast Track to More Fish", 1988.
S & K Products, Inc. "Cannon's 89 Complete Line", 1989 Big Jon, Inc. Big Jon 1990 Downriggers, 1990.
"Cabellas 1991 Spring Catalog" pp. 143-144.
"1991 Spring/Summer Catalog" pp. 57-58.
"Boat U.S." pp. 299-300.

*Primary Examiner*—Richard K. Seidel
*Assistant Examiner*—Chuck Y. Mah
*Attorney, Agent, or Firm*—Fitch, Even, Tabin & Flannery

[57] ABSTRACT

Fishing rod holder apparatus includes a support member having an upstanding wall with a pin-receiving aperture formed therein. A tubular holder member includes a mounting clevis with a pair of spaced legs. A pin extending between the spaced legs is received in the aperture of the support member. The support member includes a convex edge surface with flat portions for different positions of the tubular holder.

19 Claims, 5 Drawing Sheets

FISHING ROD HOLDER

BACKGROUND OF THE INVENTION

1. Field of the Invention

The present invention pertains to holders for fishing rods.

2. Description of the Related Art

Over the years, several arrangements have been proposed for supporting a fishing rod in a stationary position. Such arrangements may be mounted to a boat, or pier. For example, U.S. Pat. No. 4,495,721 discloses a rod holder assembly adapted for use with a down rigger. The assembly includes a cup for receiving the handle of a fishing rod, the cup being biased into position by a pair of helical springs secured to the cup with a swingable or pivotable mounting. The springs operate to move the fishing rod into a position over a boat. This arrangement is somewhat costly to produce, and is made of a relatively large number of parts. However, the cost and complexity of the system may be small in comparison to the down rigger with which the device is intended to be used.

U.S. Pat. No. 4,641,395 discloses a down rigger boom hinge for pivotally mounting down rigger booms. The hinge includes a cam portion which brings stepped locking edges of the hinge parts into interlocking engagement with one another.

U.S. Pat. No. 3,000,599 discloses a fishing rod holder including a hollow cylinder for receiving a fishing rod handle. The cylinder is pinned to an upstanding rigid support member having a rounded edge and detents at different angular positions of the mounting. A locking pin inserted through the cylinder engages the various detents of the upright mounting, thus locking the cylinder at a desired angular position.

U.S. Pat. No. 1,373,414 discloses an adjustable flagstaff holder in which a device for engaging a flag has a bifurcated mounting end with opposed legs spaced apart so as to receive an upright mounting member therebetween. The upright mounting member has a series of notches angularly disposed for different angular positions of the flag. The upright mounting member is itself mounted for movement in a horizontal plane. The adjustment of the flagstaff from one angular position to another is difficult, and requires considerable manual strength and dexterity to unlock the bifurcated holder, swing the holder to different angular positions, and then thrust the holder into a new notch.

U.S. Pat. No. 4,093,171 discloses a fishing rod holder in which a cylinder has a lower end received between the walls of an upstanding bracket. The cylinder has its lower end ground at an acute angle to the central axis of the cylinder so as to provide the necessary clearance when adjusting the cylinder to different angles of elevation.

U.S. Pat. No. 2,918,237 discloses a cylinder for receiving a fishing rod handle with a bottom end formed with bevelled cuts so as to form a pair of spaced walls protruding from one end of the cylinder body. An upright rigid support is received between the cylinder walls and has a pair of horizontally-spaced, rounded surfaces. The cylinder can be locked at different angular positions, by swinging the cylinder about the rigid mounting, so that the cylinder engages a portion of the rigid mounting adjacent one rounded surface and/or another. The cylinder is movable through a vertical position; however, it does not appear to be stable in the vertical position due to the geometry and rounded, upper surface of the rigid mounting member.

U.S. Pat. No. 4,097,017 discloses a fishing rod holder having a generally T-shaped movable head with an upper concave surface to which the handle of a fishing rod can be lashed. The T-shaped head includes a downwardly opening cylindrical stub portion having a cutout at one lateral edge. A post having a tapered end is received in the cylinder stub portion. The head may be rocked between a generally horizontal position and a single predefined position at an acute angle to the horizon, with the stub portion engaging the bevelled tip of the post. In a second embodiment, the head has wing tabs receivable in a cutout portion of an upright rigid support. The wing tabs interfere with the support to define generally vertical and generally horizontal positions of the fishing rod.

U.S. Pat. No. 4,693,660 discloses a C-clamp having a rounded corner in which are formed a plurality of apertures aligned along a circular arc. A mounting member pinned to the C-clamp carries a locking pin insertable in one of a series of apertures to lock the fishing rod holder at a desired angular position.

U.S. Pat. No. 3,802,112 discloses a cylinder for receiving a fishing rod handle, mounted alongside a vertically oriented mounting plate. An arcuate cutout in the mounting plate receives a threaded fastener inserted through the cylinder, which locks the cylinder at a desired angular position.

The above-mentioned fishing rod holders either have a limited range of motion or provide multiple angular positions for locking a fishing rod holder, more than are usually desired, at the expense of increasing the complexity and cost of the device. An improved fishing rod holder having a carefully defined number of locking positions, which can be economically fabricated from a minimum number of inexpensive parts, is still being sought after.

SUMMARY OF THE INVENTION

It is an object according to the present invention to provide an improved fishing rod holder which is movable between a limited number of defined angular positions.

This and other objects, according to the present invention, are provided in a fishing rod holder apparatus, comprising:

a base including an upstanding wall means having a pair of opposed spaced-apart major side surfaces and an outer convex edge surface therebetween comprising a series of support surface portions, said base defining a pin-receiving aperture extending adjacent the support surface portions through the base between the side surfaces;

a holder member for engaging a fishing rod, comprising a tube and a mounting clevis extending from the tube, the mounting clevis having a pair of spaced legs depending from a stop surface, the stop surface cooperating with the legs to define a channel for receiving at least a portion of said base so that the stop surface is positioned immediately adjacent the convex edge surface of the wall means; and pin means coupling at least one of said legs to said pin-receiving aperture so as to constrain movement of the stop surface as the stop surface is moved along the series of support surface portions.

DETAILED DESCRIPTION OF THE PREFERRED EMBODIMENTS

Referring now to the drawings, and initially to FIGS. 1-4, fishing rod holder apparatus or holder assembly 10 comprises a hollow cylindrical holder member or tube generally indicated at 12 and a support member or base generally indicated at 14. The base is shown mounted in a horizontal shelf or similar member 18 illustrated in phantom. The base 14 includes an upstanding wall member generally indicated at 16 having a bottom surface 20 in contact with shelf 18. According to one important feature of the present invention, upstanding wall member 16 has a pair of generally-vertical, opposed major side surfaces 22, 24 and an outer convex edge surface 28 located therebetween. Convex edge surface 28 includes a series of angularly-offset, generally planar support surface portions 30, 32, 34 and 36. As will be seen herein, the support surface portions 30, 32 engage the tube 12, and are angularly offset from one another by an obtuse angle. The support surface portion 30 faces in a generally upward direction and the support surface portion 32 is upwardly and forwardly facing so as to dispose tube 12 at a generally acute angle from the horizontal, preferably ranging between 10° and 60°, more preferably between 30° and 50°.

Upstanding wall member 16 further defines a pin-receiving aperture 40 extending between opposed side surfaces 22, 24. Aperture 40 in the preferred embodiment is comprised of a series of three portions disposed end-to-end, including end portions 42, 44 disposed at generally right angles of one another and an intermediate portion 46 having generally the same angular orientation as support surface 32. The aperture portion 42 extends in a direction generally perpendicular to the support surface portion 30 and extends to that support surface portion, forming an opening 43 therein. The opposed aperture portion 44 has a rounded end 48 which may be enlarged, if desired.

Figure 2:
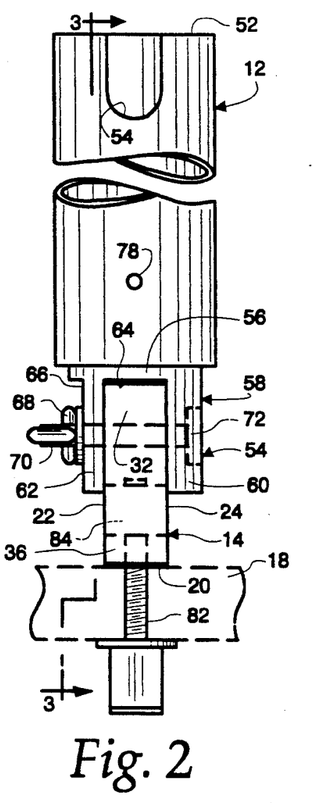
FIG. 2 is a front elevational view thereof.
Figures 3, 3A:
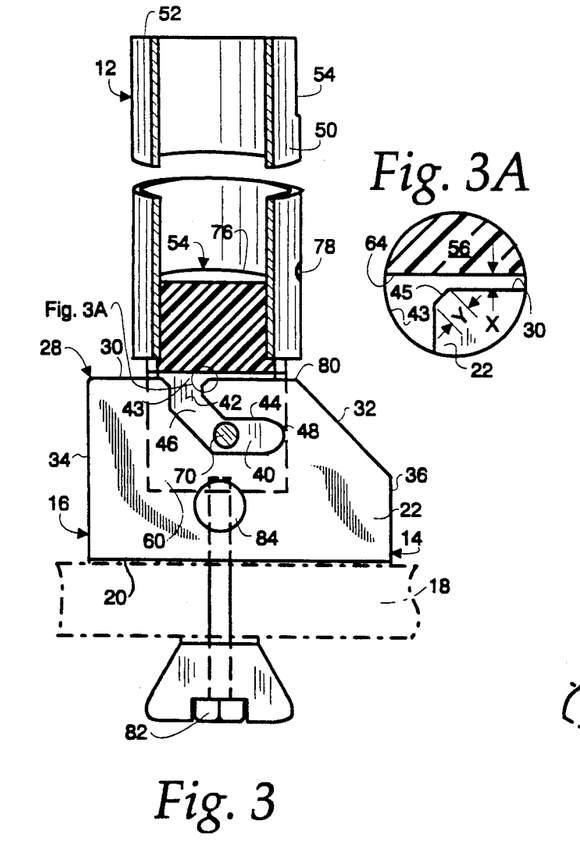
FIGS. 3 and 3a are side elevational views thereof shown partly in cross section, taken along the line 3—3 of FIG. 2.

Tube 12 includes a hollow body portion 50 having a free end 52 with a notch 54 for engaging a portion of the fishing rod holder to prevent rotation relative to the axis of hollow body portion 50. Referring to FIGS. 2 and 3, tube 12 further includes a mounting part 54 preferably made of a molded plastic material, having a cylindrical plug-like portion 56 telescopically received at the bottom end of hollow bottom portion 50. The mounting part 54 further includes a mounting clevis 58 having a pair of spaced legs 60, 62 downwardly depending from a stop surface 64 formed at the bottom of plug portion 56. With reference to FIG. 2, the mounting clevis is preferably formed by notching the lower end of mounting part 54 so as to form spaced apart portions of the mounting part which comprise the clevis legs 60, 62. The legs 60, 62 preferably have opposed, planar major surfaces and are set at right angles to the stop surface 64 which is also planar. The leg 62 preferably includes a flat surface 66 for engaging a wing nut fastener 68. The wing nut fastener 68 engages a threaded bolt 70 having a head 72 received in a hexagonal recess formed in leg 60. The bolt 70 extends between the legs 60, 62 and, as will now be explained, operates to guide movement of tube 12 between the operating position of FIG. 1 and the operating position of either FIG. 2 or 3. If desired, the bolt 70 could be replaced by other pin means, and may comprise a dimple or other protrusion only partly received in the aperture 40, protruding a distance which is less than the thickness of wall 16. However, a bolt is preferred for selective compression of the upstanding wall member 16 between legs 60, 62.

Referring now to FIGS. 3 and 3a, the bolt 70 is inserted at the free end or opening 43 of aperture portion 42 and is inserted past aperture portion 42 to the inclined aperture portion 46. It has been found especially helpful to taper one side 45 of the entrance opening, that side adjacent angled support surface 32. This prominent taper (y=1/16 inch in the preferred embodiment) helps in starting the bolt 70 in aperture 40. The opposite side of the entrance opening 43 need not be tapered. The tapered side or corner 45 could be rounded (see side 45a in FIGS. 9 and 10), but preferably is tapered with a flat surface.

The bolt 70 is then cammed against the wall portions forming aperture portion 46 as tube 12 is pushed in a series of downward and forward directions so as to bring bolt 70 into the aperture portion 44, as illustrated in FIG. 3. Generally speaking, three distinct motions are required to lock tube 12 to base 14: a downward movement, a downwardly and forwardly inclined movement, and a final forward movement.

Withdrawal of tube 12 from base 14 requires a reversal of this assembly procedure and the present invention can now be seen to prevent inadvertent release of the tube from base 14, while preventing build-up of momentum in any one direction. Momentum created during insertion or removal is broken up over the series of three distinct path portions. This is particularly advantageous for certain types of materials which may offer strength or economic advantages, but which may not offer perfectly smooth sliding during insertion or withdrawal of the rod holder. Further, even if the rod holder apparatus is optimized for ease of sliding of the interfitting parts, salt water, lake water, over-tightening of the bolt fastener, solar radiation curing of the materials or other effects can cause friction forces between the moving parts. As pressure is applied to the tube, it is important that the exact direction and velocity be controlled and that insertion forces be limited. The present invention provides a continuous path for the tube pin, but breaks the path into several angularly offset segments which absorb momentum which would otherwise build up along a straight, linear path. In addition, inadvertent withdrawal of the tube is prevented. FIG. 3 shows a first operating position of tube 12, disposed in a generally vertical or upright direction. Any water that would enter the opening of hollow body portion 50 will contact the concave or domed upper surface 76 of plug portion 56, traveling to an exit or weep hole 78, thus clearing the hollow body portion 50 of any water accumulation.

Figure 1:
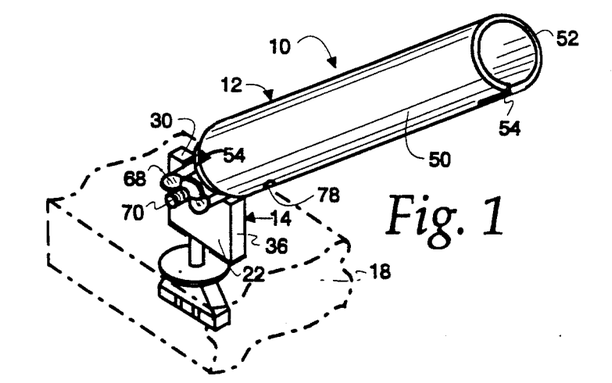
FIG. 1 is a perspective view of a fishing rod holder, according to principles of the present invention.

To assume the second operating position as indicated in FIG. 1, two distinct motions are needed: a forward motion moving the bolt 70 toward and into contact with the rounded end 48 and a pivoting of tube 12 about the bolt 70. These motions cause stop surface 64 of mounting part 54 to slide across support surface portion 30, over rounded corner 80 and across surface portion 32 to obtain the operating position illustrated in FIG. 1. The present invention provides advantages against inadvertent release of tube 12 from base 14 when shifting the tube from the forward inclined position to the vertical position illustrated in FIG. 3.

The above-steps are reversed with the pivoting of tube 12 about bolt 70, at the rounded end of 48 of aperture 40. As the leading edge of stop surface 64 clears rounded corner 80, the tube 12 is pulled in a backward direction, into a boat for example, so as to travel along aperture portion 44 in a direction generally parallel to support surface 30. An unintentional dislodgement of the tube from the base is prevented because, even with excessive movement, the bolt 70 will engage the walls of angled aperture portion 46 and further movement of tube 12 will be blocked in this manner. Further, the removal of tube 12 from base 14 requires two different motions: first, a motion in the direction of angled aperture portion 46; and as the bolt 70 enters aperture portion 42, an upward pull will complete this engagement of the tube 12 from base 14.

Varying movements of tube 12 with respect to base 14, legs 60, 62 preferably engage the side surfaces 22, 24 of upstanding wall 16 so as to confine the movement of bolt 70 within aperture 40, and so as to aid travel of bolt 70 in aperture 40.

One preferred manner of mounting base 14 to shelf portion 18 is illustrated in FIGS. 1-3 wherein a threaded bolt 82 is received in a threaded fastener 84 preferably press-fit into wall 16.

Figure 4:
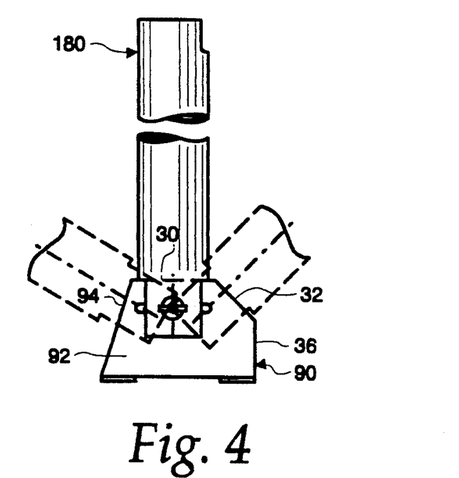
FIG. 4 is a fragmentary side elevational view of the cylinder of FIGS. 1-3, shown mounted in a second mounting base.
Figures 5, 6:
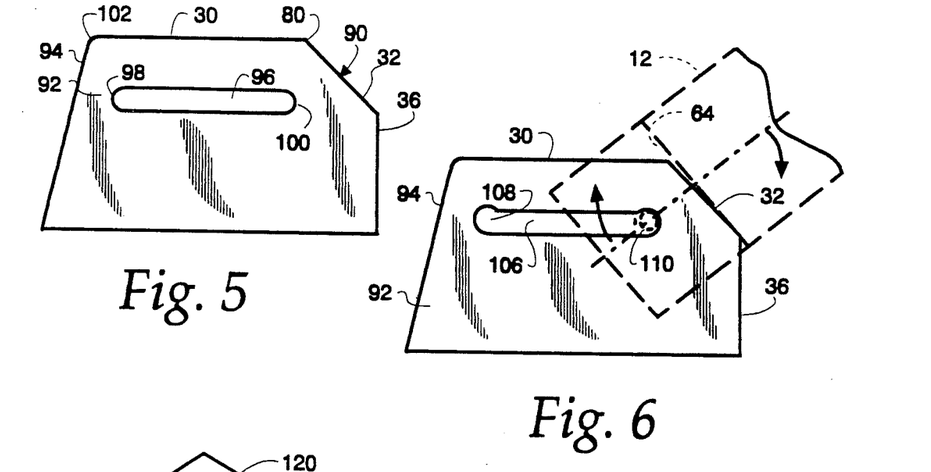
FIGS. 5 and 6 show alternative embodiments of the mounting base of FIG. 4.
Figure 15:
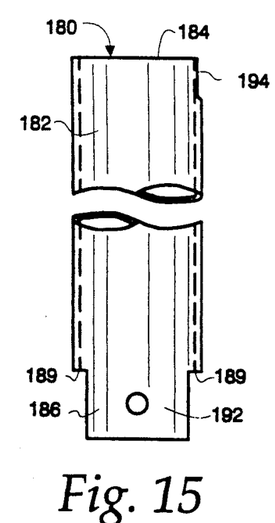
FIG. 15 is a side elevational view of an alternative embodiment of a rod-receiving cylinder according to the present invention.
Figure 16:
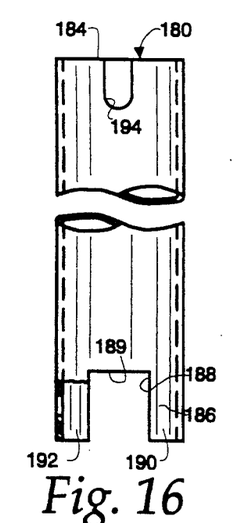
FIG. 16 is front elevational view of the cylinder of FIG. 15.

Referring now to FIGS. 4-6, alternative embodiments of base 14 are illustrated at 90, with the tube 180 of FIGS. 15 and 16. Base 90 includes an upstanding wall 92 having a convex edge surface with support surface portions 30, 32 and a surface portion 36, identical to those portions of wall 16 illustrated in FIG. 3, for example. In addition, however, upstanding wall 92 includes a third support surface portion 94 which is also angularly offset from its neighboring support surface portion 30 with an obtuse angle to form a series of three angularly offset support surface portions. The tube 12 is moveable about the three support surface portions 30, 32 and 94 as illustrated in FIG. 4.

Turning now to FIG. 5, upstanding support wall 92 has a pin-receiving aperture 96 which is formed along a generally straight line, and has opposed rounded ends 98, 100. The rounded end 100 of pin receiving aperture 96 is located adjacent rounded corner 80 and rounded end 98 is located adjacent a rounded corner 102 located between support surface portions 30, 94.

Referring now to FIG. 6, upstanding wall 92 has a pin-receiving aperture 106 having an alternative configuration, with enlarged rounded end portions 108, 110 which ease the transition in moving tube 12 from an inclined position to a substantially vertical position resting against support surface 30. As indicated in FIG. 6, it is generally preferred in the various embodiments that when the tube is resting in an inclined position against a support surface portion of the upstanding base wall, the stop surface of the tube form a very small acute angle with the inclined support surface portion. As illustrated in FIG. 6, a small gap is created between the support surface portion of tube 12, adjacent the center line of the tube and the support surface portion 32 of upstanding wall member 92.

Figure 7:
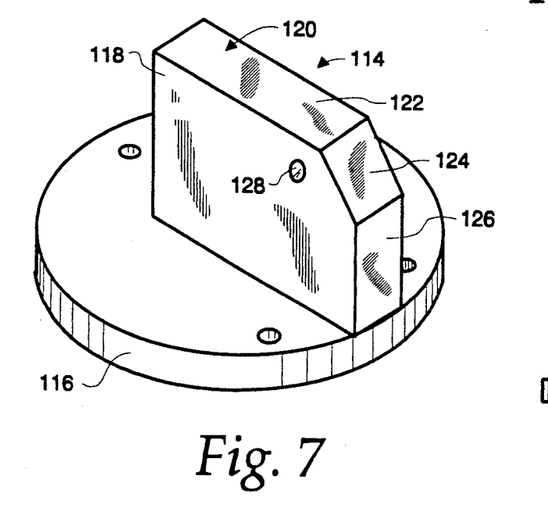
FIG. 7 is a perspective view of a further alternative embodiment of a mounting base, according to principles of the present invention.

Referring now to FIG. 7, an alternative embodiment of a base is generally indicated at 114. The base includes a mounting disk 116 and an upstanding support wall 118. Wall 118 has a convex outer surface generally indicated at 120 comprising angularly offset, generally planar support surface portions 122, 124 and a front surface portion 126. The support surface portions 122, 124 are angularly displaced from one another with an obtuse angle, and a rounded corner 126 is located between the support surface portions 122, 124. A generally cylindrical aperture 128 extending through the support wall 118, from one major surface to another, is located adjacent the rounded corner 126. When used with base 114, the tube 12 described above has the bolt 70 thereof inserted through aperture 128. The stop surface 64 engages the generally horizontal support surface portion 122, to orient the holder assembly in a vertical direction. By pivoting the tube about the center line of aperture 128, the stop surface 64 of tube 12 is cammed over the rounded corner 126 to contact the support surface portion 124. A relatively close tolerance fit is dimensioned with tube 12 pressing against rounded corner 126 when the center line of the tube hollow body portion bisects the angle between the support surface portions 122, 124.

Figure 8:
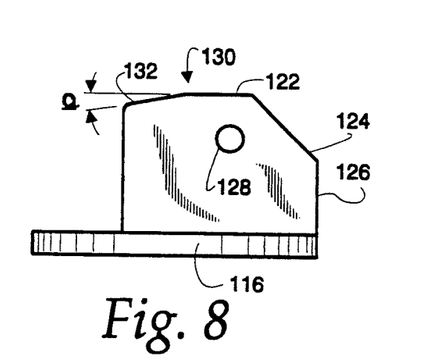
FIG. 8 is a side elevational view showing an alternative embodiment of the mounting base of FIG. 7.

Turning now to FIG. 8, a support base is generally indicated at 130 and has features identical to those of the aforementioned support base 114. As a point of difference, the upper support surface 132 has an angular relief so as to form a distinct supporting surface portion 132 angularly displaced from support surface portion 122 with an angle slightly less than 180°. In the preferred embodiment, the angular displacement a ranges between 1° and 20°.

Figure 9:
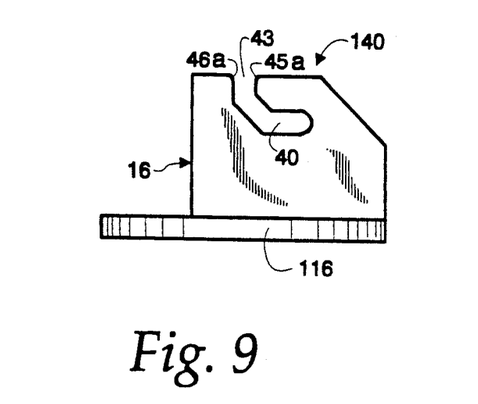
FIG. 9 shows the mounting base of FIGS. 1-3 in a side elevational view.
Figure 10:
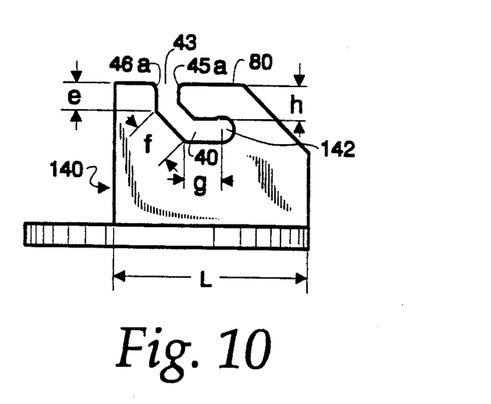
FIG. 10 shows an alternative embodiment of the mounting base of FIG. 9.
Figure 11:
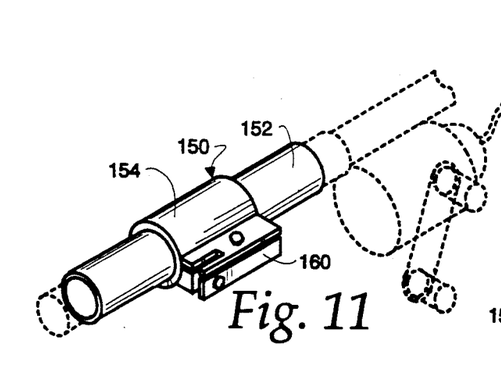
FIG. 11 is a perspective view of an alternative embodiment of the fishing rod holder illustrating aspects of the present invention.

Referring now to FIG. 9, a further alternative embodiment of a support base is generally indicated at 140. The support base 140 includes the aforedescribed upstanding support wall 16, mounted to a mounting disk 116, similar to that illustrated in FIG. 7. The base 140 has the same three-portion aperture 40 shown above in FIG. 3. The holder 12 is preferred for use with these bases, rather than the holder 180 of FIGS. 15, 16 for example. Certain dimensions of the pin-receiving aperture 40 are shown in FIG. 10. For example, the dimensions e, f, g and h are approximately $\frac{1}{8}$, $\frac{1}{2}$, $\frac{1}{2}$, and $\frac{1}{2}$ inch respectively, while the base length L is approximately 2$\frac{1}{4}$ inches. The aperture 40 is provided with an optional enlarged rounded end 142 to aid the stop surface 64 of tube 12 in camming over the rounded corner 80. The opening 43 is formed by rounded corner 45a which has a relatively large radius of curvature so as to approximate the beveled edge 45 of FIG. 3a. The opposite corners 46a are also rounded, but this feature can be omitted if desired, since it has been found more important to bevel or round off the other corner 45a.

Figure 12:
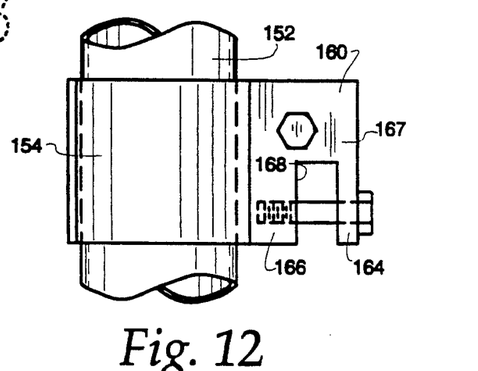
FIG. 12 is a top plan view thereof.
Figure 13:
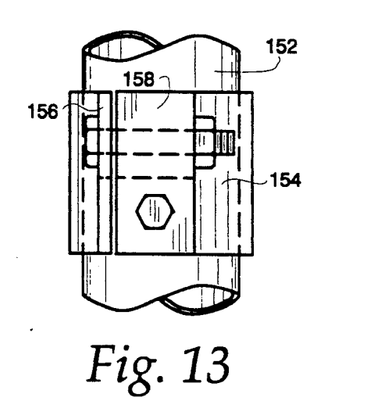
FIG. 13 is a front elevational view thereof.
Figure 14:
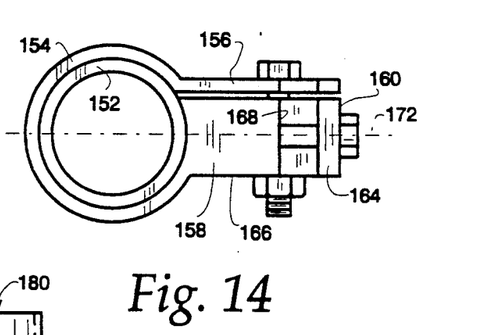
FIG. 14 is a front elevational view thereof.

Referring now to FIGS. 11–14, an alternative embodiment of a tube is generally indicated at 150. The tube 150 includes a cylindrical hollow body portion 152 and a split mounting collar 154 having first and second split portions 156, 158 (see FIG. 14). A clevis or mounting part 160 extends from the split collar 154 to one side of tube 152. The mounting part 160 includes a clevis with legs 164, 166 formed by a notch 168 formed in the split collar parts 156, 158. As can be seen in FIG. 14, for example, the notch 168 is formed in a direction generally perpendicular to a mid-plane 172 of tube 152. As shown in FIGS. 12 and 14, the legs 164, 166 of the clevis are both mounted to one side of the central axis of tube 152 and extend in the same direction as that axis.

Turning now to FIGS. 15 and 16, an alternative embodiment of a tube is generally indicated at 180. Tube 180 includes a generally cylindrical body portion having an upper free end 184 and a lower end 186 which is notched at 188 to form stop surface 189 and a pair of spaced legs 190, 192. Thus, the lower portion of the tube has the form of a clevis. The notch is preferably formed in generally diametrically opposed portions of end 186, so as to form the legs 190, 192, extending from stop surface portions 189. A recess 194 is located adjacent the free end 184. The tube 180 can be used with any of the bases described above. For example, referring to FIG. 17, the tube 180 is shown mounted to the aforedescribed upstanding mounting wall 16, a bolt threaded fastener or pin 196 extends through pin-receiving aperture 40 and is held in place by threaded fastener 198.

Figures 17, 18:
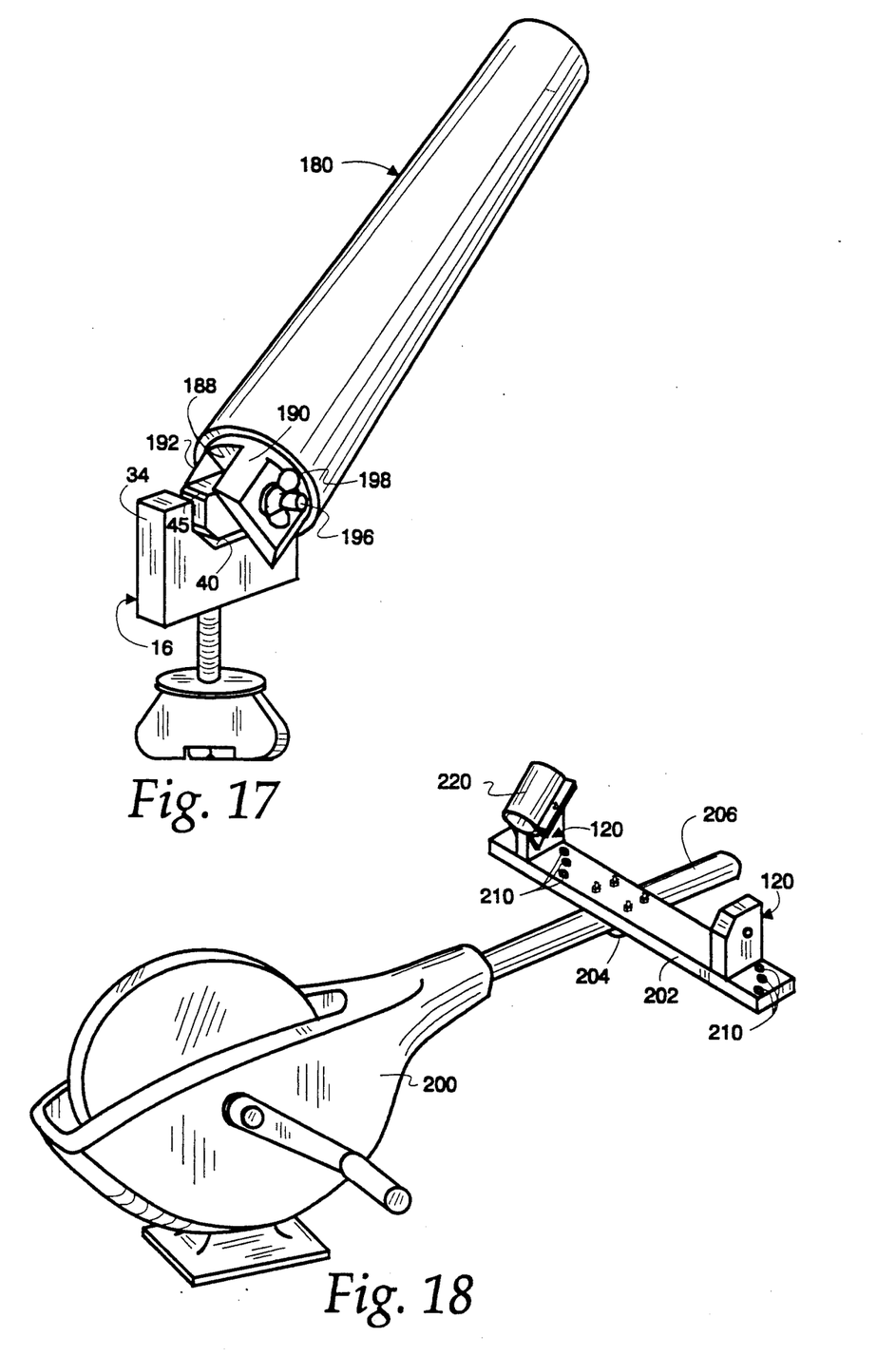
FIG. 17 is a perspective view showing the cylinder of FIGS. 15 and 16 mounted to the base of FIG. 9.
FIG. 18 is a perspective view of an alternative embodiment of a fishing rod holder illustrating aspects of the present invention, with the cylinder of FIGS. 15 and 16 mounted to the base of FIG. 7 and supported from a down rigger with a bracket.

FIG. 18 shows an alternative embodiment of a holder assembly according to principles of the present invention secured to a down rigger 200. A support bar 202 is clamped with U-bolts 204 to a mast 206 of the down rigger. The support bar has a pair of laterally opposed ends each of which include an upstanding mounting wall 120, as described above. A tube or collar 220 is shown secured to one mounting wall 120, although the aforedescribed tubes 12 or 180 could also be used. An arcuate array of mounting apertures 210 are formed at each end of support bar 202. A locating pin 211 extends from the bottom surface of upstanding walls 120 to be received in various ones of the apertures 210 to provide a horizontal adjustment for the holder assembly (see FIG. 22).

Figures 19, 20, 21, 22:
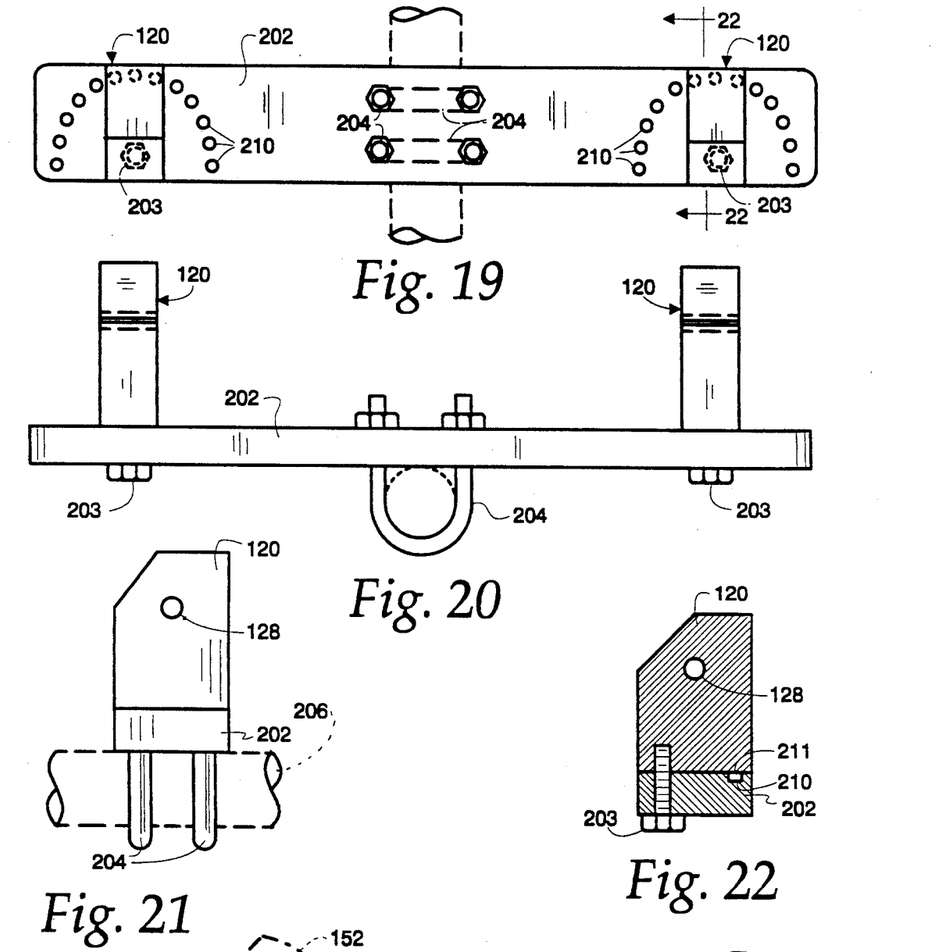
FIG. 19 a top plan view of the arrangement of FIG. 18.
FIG. 20 is a front view of the arrangement of FIG. 18.
FIG. 21 is a side elevational view of the arrangement of FIGS. 18-20.
FIG. 22 is a cross-sectional view taken along the line 22 of FIG. 19.

FIGS. 19 and 20 show the holder assembly in greater detail, and FIGS. 21 and 22 show mounting of the upstanding mounting walls 120 to the support bar 202, using threaded fasteners 203. FIGS. 21 and 22 show the upstanding mounting wall 120.

Figure 23:
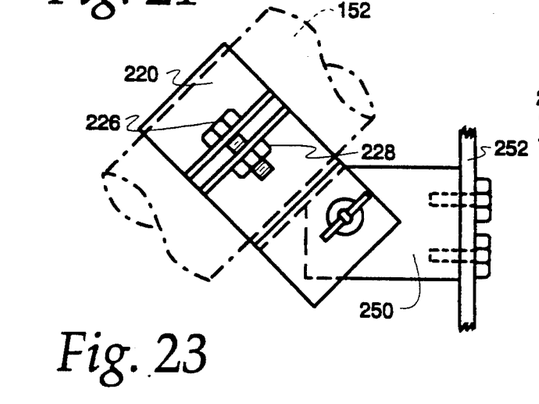
FIG. 23 is a side elevational view of an alternative embodiment of a mounting for a fishing rod holder.
Figure 24:
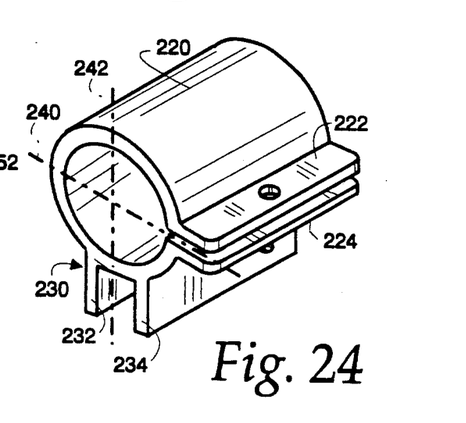
FIG. 24 is a perspective view of the mounting of FIG. 23.

Referring now to FIGS. 23 and 24, collar 220 is split at overlapping tabs 222, 224 which are compressed together by a threaded fastener such as a bolt and nut arrangement 226, 228 (see FIG. 23) to compress the collar about a tube 152 or directly about a fishing rod. A clevis 230 having a pair of spaced apart legs 232, 234 extend in the axial direction of the tube, and are located to one side of a generally horizontal mid-plane 240. However, the legs 232, 234 are located on opposite sides of a generally vertical mid-plane 242, which passes through the central longitudinal axis of the split collar. As used herein, the reference directions horizontal and vertical are arbitrary and are used for purposes of description only. As indicated in FIG. 23, for example, the upstanding support wall need not extend in a vertical direction. For example, an upstanding support wall 250 having the same operating features, but slightly different geometric configuration from the upstanding support wall 114 of FIG. 5, extends in a generally horizontal direction with a base surface secured to a vertical mounting wall 252. As illustrated in FIG. 23, a tube 152 can be oriented in either a generally vertical direction or an inclined direction as indicated in FIG. 23.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have bee employed, they are intended in a generic and descriptive sense only and not for the purposes of limitation, the scope of the invention being delineated by the following claims.

What is claimed is:

1. A fishing rod holder apparatus, comprising:
   a base including an upstanding wall means having a pair of opposed spaced-apart major side surfaces and an outer convex edge surface therebetween comprising a series of generally planar support surface portions which are angularly displaced from one another, said base defining a pin-receiving aperture extending adjacent the planar support surface portions through the base between the side surfaces;
   a holder member for engaging a fishing rod, comprising a tube and a mounting clevis extending from the tube, the mounting clevis having a pair of spaced legs depending from a generally planar stop surface, the planar stop surface cooperating with the legs to define a channel for receiving at least a portion of the convex edge surface of said base so that the planar stop surface is positioned immediately adjacent the convex edge surface of the wall means;
   pin means extending through said pin-receiving aperture so as to couple at least one of said legs to said wall means so as to constrain movement of the planar stop surface into and out of abutting engagement with the series of planar support surface portions, with the planar stop surface being moved from one planar support surface portion to another as the holder member is moved with respect to said base; and said pin means, said pin-receiving aperture and said holder member cooperating to bring the planar stop surface into abutting engagement with said planar support surface portions to provide a positive stop for the holder member with respect to the base.

2. The apparatus of claim 1 wherein said pin-receiving aperture is elongated, of generally constant width, and of generally linear configuration.

3. The apparatus of claim 2 wherein the convex edge surface includes a series of at least three consecutive support surface portions with a medial support surface portion extending generally coextensive with and parallel to the pin-receiving aperture.

4. The apparatus of claim 2 wherein said pin-receiving aperture is spaced from the wall means support surface portions.

5. The apparatus of claim 4 wherein said pin-receiving aperture has a pair of opposed end portions, both of which are enlarged relative to the aperture width.

6. The apparatus of claim 1 wherein said pin-receiving aperture is elongated and double-ended, with one end located at a support surface portion so as to form an opening thereat.

7. The apparatus of claim 6 wherein said pin-receiving aperture has at least three consecutive linear portions including two end portions extending at generally right angles to each other with one end portion forming an opening in one said support surface portion.

8. The apparatus of claim 1 wherein the tube is double-ended and the mounting clevis has a body portion telescopically received in one end of the tube.

9. The apparatus of claim 1 wherein the tube is double-ended and comprises a cylindrical wall and the mounting clevis is formed by notching one end of the cylindrical wall at two generally diametrically opposed portions so as to expose edges comprising said stop surface and so that end portions of said tube extending beyond the exposed edges comprise the legs of said clevis.

10. The apparatus of claim 1 wherein said pin-receiving aperture is generally cylindrical, having circular openings on the side surfaces of said upstanding wall means.

11. The apparatus of claim 1 wherein the legs of the mounting clevis have opposed generally planar major surfaces and the stop surface is generally planar.

12. The apparatus of claim 11 wherein the tube has a central longitudinal axis and an outer periphery, the central longitudinal axis of said tube extending between the legs of said clevis.

13. The apparatus of claim 11 wherein the tube has a central longitudinal axis and the legs of the clevis are located to one side of the tube central longitudinal axis on opposite sides of a midplane extending through the tube central longitudinal axis.

14. The apparatus of claim 11 wherein the tube has a central longitudinal axis and the legs of the clevis are located to one side of the tube central longitudinal axis and are elongated in the general direction of the tube central longitudinal axis.

15. A fishing rod holder apparatus, comprising:

a base including an upstanding wall means having a pair of opposed spaced-apart major side surfaces and an outer convex edge surface therebetween comprising a series of generally planar support surface portions which are angularly displaced from one another;

said base defining a pin-receiving aperture adjacent the planar support surface portions, extending through the base between the side surfaces, said pin-receiving aperture having at least three consecutive, differently directed portions including two end portions extending at generally right angles to each other, with one end portion extending to at least one planar support surface portion so as to form the opening thereat;

a holder member comprising a double-ended hollow tube and a mounting clevis having a body portion telescopically received in one end of the tube, the mounting clevis having a pair of spaced legs depending from a generally planar stop surface which extends across a central axis of the tube, the planar stop surface cooperating with the legs to define a channel for receiving at least a portion of said wall means with the planar stop surface immediately adjacent the convex edge surface of the wall means;

pin means extending between said legs and received in said pin-receiving aperture to constrain movement of the planar stop surface into and out of abutting engagement with the series of planar support surface portions, with the planar stop surface being moved from one support surface portion to another as the holder member is moved with respect to said base; and said pin means, said pin-receiving aperture and said holder member cooperating to bring the planar stop surface into abutting engagement with said planar support surface portions to provide a positive stop for the holder member with respect to the base.

16. The apparatus of claim 15 wherein the portions of said pin-receiving aperture are linear, and are of generally constant width throughout.

17. The apparatus of claim 15 wherein the legs of the mounting clevis have opposed generally planar major surfaces and the stop surface is generally planar.

18. The apparatus of claim 17 wherein the tube has a central longitudinal axis, the central longitudinal axis of said tube extending between the legs of said clevis.

19. A fishing rod holder apparatus, comprising:

a base including an upstanding wall means having a pair of opposed spaced-apart major side surfaces and an outer convex edge surface therebetween comprising a series of generally planar support surface portions which are angularly displaced from one another, said base defining a pin-receiving aperture spaced from and extending adjacent the planar support surface portions through the base between the side surfaces, the pin-receiving aperture being elongated, of generally constant width, and of generally linear configuration;

a holder member for engaging a fishing rod, comprising a double-ended tube with a cylindrical wall and a mounting clevis formed by notching one end of the cylindrical wall at two generally diametrically opposed portions so as to expose edges comprising a generally planar stop surface, the mounting clevis having a pair of spaced legs depending from said stop surface comprising end portions of said tube extending beyond the exposed edges, the planar stop surface cooperating with the legs to define a channel for receiving at least a portion of said base so that the planar stop surface is positioned immediately adjacent the convex edge surface of the wall means;

pin means coupling at least one of said legs and said wall means, being received in said pin-receiving aperture so as to constrain movement of the planar stop surface as the planar stop surface is brought into and out of abutting engagement with the series of planar support surface portions, the planar stop surface being moved from one planar support surface portion to another as the holder member is moved with respect to said base; and said pin means, said pin-receiving aperture and said holder member cooperating to bring the planar stop surface into abutting engagement with said planar support surface portions to provide a positive stop for the holder member with respect to the base.

* * * * *

UNITED STATES PATENT AND TRADEMARK OFFICE
CERTIFICATE OF CORRECTION

PATENT NO. : 5,210,971
DATED : May 18, 1993
INVENTOR(S) : Efantis

It is certified that error appears in the above-identified patent and that said Letters Patent is hereby corrected as shown below:

ON THE TITLE PAGE:

[56] References Cited - OTHER PUBLICATIONS, line 8, after "1989" insert a period.

[56] References Cited - OTHER PUBLICATIONS, line 8, start a new line for the "Big Jon, Inc." reference and change the reference to read --Big Jon, Inc. "Big Jon 1990 Downriggers", 1990.--.

Column 6, line 35, after "that" insert a comma.

Column 7, line 8, change "a" to --a--.

Column 7, line 20, change "e, f, g and h" to --e, f, g and h--.

Column 8, line 42, change "bee" to --been--.

Signed and Sealed this

First Day of February, 1994

BRUCE LEHMAN

Attest:

Attesting Officer

Commissioner of Patents and Trademarks